United States Patent Office 2,805,950
Patented Sept. 10, 1957

---

2,805,950

PREPARATION OF CHEESE CULTURES

Arthur B. Erekson, Lafayette, Calif., assignor to The Borden Company, New York, N. Y., a corporation of New Jersey No Drawing. Application September 9, 1954,
Serial No. 455,083

6 Claims. (Cl. 99—116)

This invention relates to a method of preparing bacterial cultures for use in making Swiss cheese.

The manufacture of Swiss cheese is a very old art which has been the subject of many careful scientific studies with a view to improving the quality of the cheese and controlling the various steps which must all be performed with great skill in order to produce a top quality cheese.

The process of making Swiss cheese involves the following steps:

1. Preparing the milk, which may require adjustment of the fat to casein ratio (standardizing), pasteurizing, clarifying and/or other treatments;
2. Inoculating the milk with suitable cultures, and adding rennet to set the curd;
3. Cutting the curd, cooking, stirring, etc.;
4. Dipping or otherwise separating the curd from the whey and pressing the curd;
5. Salting the curd, usually done by immersion of the pressed block of curd in saturated brine;
6. Curing in a warm room during which time the cheese expands due to formation of gas pockets known as the "eyes" of the cheese; and
7. Aging by storage in a cold room.

The first six of these steps are all very critical and determine the quality of the cheese produced. These six steps require usually from five to eight weeks before the eyes are fully developed and the cheese is ready to be stored for aging in a cold room. During this period of time a sequence of complicated bacterial actions and chemical reactions occur. For example, it is very important that different strains of bacteria be present in the milk to produce the right amount of lactic acid between the time that the cultures are added to the milk and the pressed curd is removed from the press. Some of the lactic acid thus formed eventually is converted into lactates which serve as the food for propionic bacteria that reproduce in the curd during the curing period in the warm room to generate carbon dioxide gas, expand the cheese and form the gas pockets or holes which are known as the eyes in Swiss cheese.

The finished Swiss cheese is usually graded into several different grades, depending upon the size and distribution of the eyes, the texture of the cheese and the flavor of the cheese. Cheese sold as natural Swiss cheese is usually graded A, B or C, and the price of the cheese varies several cents per pound from one grade to another. Swiss cheese of lower grade is usually called a "grinder," because it is ground up and used to make processed cheese. Grinders are sold for a substantially lower price than the marketable grades. Thus, every Swiss cheesemaker tries to produce as many top grade cheeses as possible, but even the most skillful find it difficult to produce top quality grades day after day throughout the different seasons of the year, because of variations in his milk supply and other factors.

A particularly difficult factor to control heretofore has been the strengths of the cultures added to the milk at the beginning of the cheese making process. Pure cultures have been developed and used for this purpose, but these domesticated cultures vary in strength from time to time, are not particularly resistant to cheese making conditions and therefore are not always reliable. Many cheesemakers use whey cultures prepared from day to day by saving out a small amount of whey from a previous day's cheese making operation. The wild organisms from this source are usually more resistant, but even with whey cultures a great deal of guesswork is required. The cultures last only a very short time without deteriorating in strength, and the cheesemaker at best can only exercise his best judgment and lacks any real scientific control over the cultures he uses.

One object of this invention is to provide cultures that can be standardized and held at full strength for many months to provide the Swiss cheesemaker with a culture of known strength and composition day after day. This enables him to adjust accurately the amount of the different bacteria to be added to each batch of milk based on his experience of the previous days.

I have discovered that whey cultures for making Swiss cheese can be prepared and stored for many months without substantial deterioration if the culture after preparation is reduced to the frozen state. I have further discovered that Swiss cheese cultures made from whey can be frozen and kept in this state for many months without substantial deterioration by the addition of milk solids to the culture shortly before it is frozen. The numbers of useful organisms surviving the freezing process are far greater when milk solids such as skim milk powder is added to the culture, and these added milk solids protect the organisms both during freezing and while the frozen culture is stored, giving a standardized culture that can be used for a period of months which is not otherwise obtainable.

The following are examples of preferred methods of preparing Swiss cheese cultures in accordance with my invention.

*Example I.*—A culture of *Streptococcus thermophilus* is prepared by drawing off some of the fresh whey from a Swiss cheese making operation. The whey may be taken directly from the vat or kettle in which the cheese is made and preferably is drawn off before any salt is added to it. For example, the whey may be drawn off anytime after the cooking temperature is attained but before salt is added or the cheese is dipped. This whey is then heated to a temperature of at least 156° F. for a period of 5 to 15 minutes. If desired, the whey may be heated to a somewhat higher temperature up to 170° F. for a slightly shorter time. This heating is designed to eliminate the Lactobacilli (rods) and any yeasts, molds or other contaminants found in the whey, and to produce a fairly pure culture of *S. thermophilus*. The heated whey is then cooled to 115° F. or lower and placed in a warm room or incubator at a temperature around 90° F. for a suitable period of time, such as 16 to 18 hours. At the end of this time the acid in the whey should have increased from around 0.12% to around 0.35 to 0.40%. It is also desirable to check the incubated culture under a microscope to make sure it contains no rods or other contaminants. If the acid development and microscope examination are satisfactory, there is then added to the incubated culture about 5 to 15%, by weight, of high grade skim milk powder which is stirred into the culture sufficiently to eliminate any lumps. I have found that the addition of about 10% skim milk powder is usually very satisfactory for this purpose.

The incubated culture containing the added milk solids is then placed directly in a freezer and frozen at a temperature of −5 to −10° F. or lower. If desired, the culture may be packaged either after or before freezing.

I have found it convenient to package about 900 cc. or a quart of this culture in polyethylene bags and freeze the culture in the bags. Quick freezing, of course, is desirable but not essential. By packaging the culture in small flat packages convenient for use in subsequent cheese operations, it is also possible to speed up the freezing process somewhat. The frozen culture may then be stored in an ordinary deepfreeze, preferably at a temperature no warmer than +10° F.

Frozen cultures thus prepared may be taken from the packages and added in measured amounts directly to the milk used for making cheese, allowing the frozen culture to thaw out in the milk. If desired, however, the culture may of course be thawed before it is added to the milk in the cheese making operation.

*Example II.*—A second culture may be similarly prepared to contain a mixture of *S. thermophilus* and Lactobacilli. In this case the fresh whey from the same source is heated only to 150° F. or less. The heating in this case is not really essential, although it is better to heat the whey to 145 to 150° F. in order to eliminate any yeasts, molds or similar contaminants. In this case the whey is again incubated in the same manner until the acid in the whey increases to around 0.50 to 0.70%. This incubated culture then contains a mixture of rods and *S. thermophilus* and again is similarly prepared for freezing by adding 5 to 15% by weight of milk powder, preferably around 10% of skim milk powder and freezing and storing as in the case of Example I.

In both of the foregoing examples whole milk powder or partially skimmed milk powder may be employed instead of the skim milk powder, although the former are not needed, and of course are more expensive.

In the use of these cultures to make Swiss cheese, the amounts and proportions of the two different cultures which are added to the milk are determined by the Swiss cheesemaker in accordance with the pH of the cheese from the previous day's make, or in accordance with the rate of change of pH of the cheese on the press, as will be readily understood by those skilled in the art. I have found that under ordinary conditions, good results have been obtained adding 10 cc. of the rod culture (Example II), and 2700 cc. of the *S. thermophilus* culture (Example I) to a batch of 7000 pounds of milk. However, the amount of the rod culture used may be either higher or lower, and in some cases no rod culture is needed at all, depending upon the source and quality of the milk employed. Likewise, the amount of the *S. thermophilus* culture used may vary, for example, all the way from 450 to 4500 cc. per 8000 pounds of milk, depending upon the season of the year, the contaminants in the milk supply, etc.

My invention does make it possible, however, for a skilled cheesemaker to adjust his culture additions on any given day in accordance with the results obtained in previous days because these cultures have the advantage of being of known strength day after day and even month after month, as contrasted with the ordinary cultures which are made up on a more or less day to day basis and are of variable strengths.

One of the big problems in making Swiss cheese has always been the problem of obtaining the right proportions of *S. thermophilus* and rods for a given batch of milk. By using one culture which is substantially a pure culture of *S. thermophilus* of known strength, I have been able to control the Swiss cheese making operation in such a way that the quality of the cheese would run practically all A's and B's over a long period of time.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A method of preparing a culture for use in making Swiss cheese which comprises preparing a whey culture of *Streptococcus thermophilus* substantially free from Lactobacilli and contaminating yeasts and molds, incubating said culture to increase the acid in the whey to around 0.35–0.40%, adding about 5 to 15% by weight of milk powder to the incubated culture, and cooling and freezing the mixture.

2. A method of preparing a culture for use in making Swiss cheese which comprises preparing a whey culture of *Streptococcus thermophilus* and Lactobacilli, incubating said culture to increase the acid in the whey to around 0.50–0.70%, adding about 5 to 15% by weight of milk powder to the incubated culture, and cooling and freezing the mixture.

3. A method of preparing a culture for use in making Swiss cheese which comprises selecting fresh whey from a Swiss cheese making operation, heating said whey to a temperature in the range of 156–170° F. to eliminate substantially Lactobacilli, yeasts, molds and other contaminants, cooling said whey and incubating the whey until the acid therein is substantially increased, adding about 5 to 15% by weight of milk powder to the incubated whey, and cooling and freezing the mixture.

4. A method as defined in claim 3 in which about 10% by weight of skim milk powder is added to the incubated culture before freezing.

5. A method of preparing a culture for use in making Swiss cheese which comprises selecting fresh whey from a Swiss cheese making operation, heating said whey to a temperature of the order of 140–150° F. to eliminate contaminants, cooling and incubating the whey until the acid therein is substantially increased, adding about 5 to 15% by weight of milk powder to the incubated whey, and cooling and freezing the mixture.

6. A method as defined in claim 5 in which about 10% by weight of skim milk powder is added to the incubated culture before freezing.

References Cited in the file of this patent

UNITED STATES PATENTS

| | | |
|---|---|---|
| 1,918,053 | Nitardy et al. | July 11, 1933 |
| 1,957,555 | Reichel et al. | May 8, 1934 |
| 2,121,442 | Nordsiek | June 21, 1938 |
| 2,446,550 | North et al. | Aug. 10, 1948 |

OTHER REFERENCES

Jacobs: The Chemistry and Technology of Food and Food Products, vol. 2, Interscience Pub. Inc., N. Y., pages 389–390.

Werkman: Bacterial Physiology, 1951, Academic Press, N. Y., pages 127–132.